Aug. 17, 1965
R. G. OLSON ETAL
3,200,596
CYLINDER AND PISTON ARRANGEMENT
Filed April 30, 1962
2 Sheets-Sheet 1
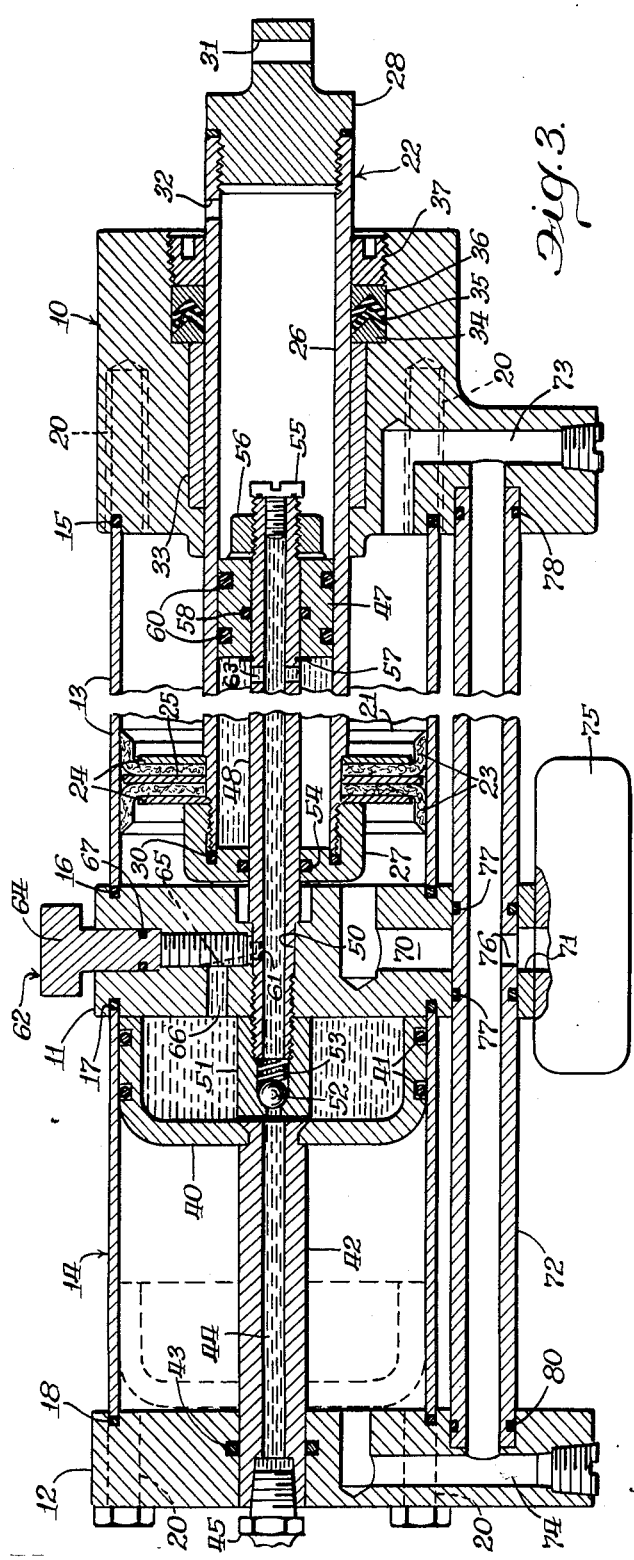
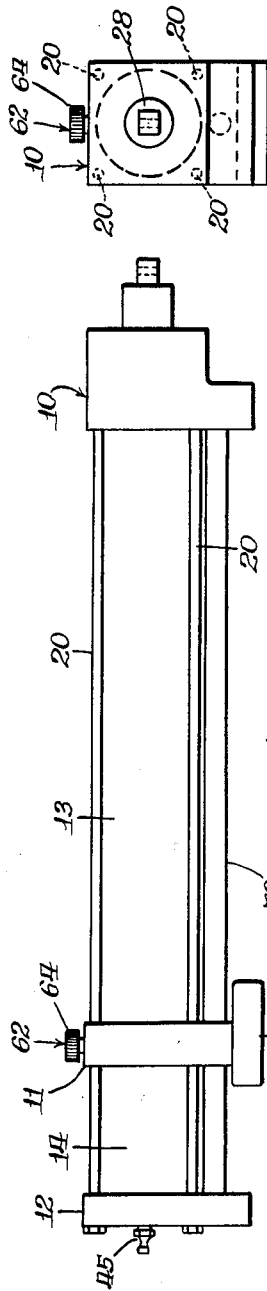
INVENTORS.
Raymond G. Olson
Howard W. Ronfeldt
By Snow and Benno
Attys.

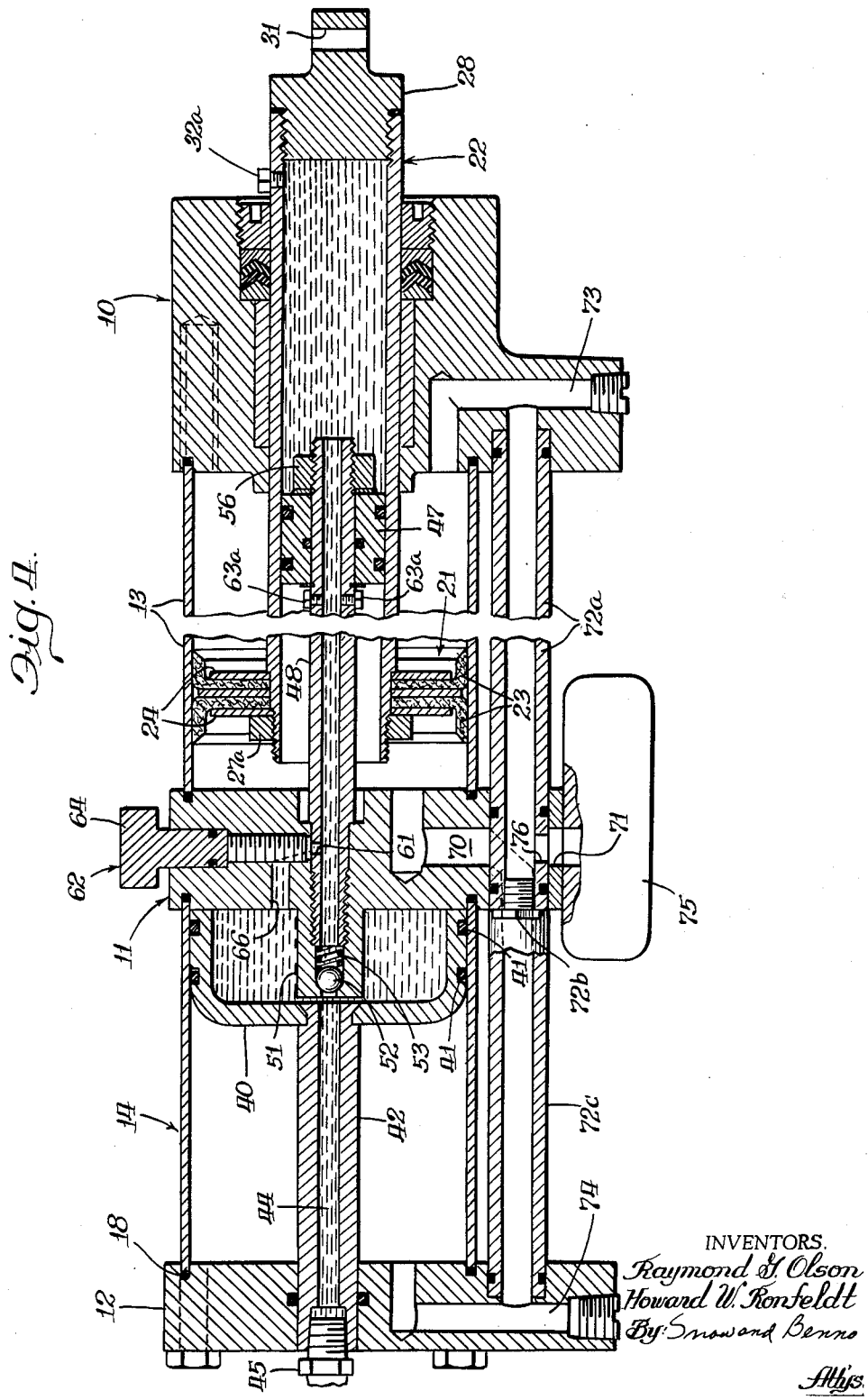

3,200,596
CYLINDER AND PISTON ARRANGEMENT
Raymond G. Olson, Niles, Ill., and Howard W. Ronfeldt, Kalamazoo, Mich., assignors to Power Control Products, Inc., a corporation of Illinois
Filed Apr. 30, 1962, Ser. No. 190,884
8 Claims. (Cl. 60—54.5)

This invention relates generally to cylinder and piston arrangements and more particularly to pneumatically operated and hydraulically controlled cylinder and piston arrangements.

The primary object of the present invention is to provide a novel hydraulically controlled air cylinder and piston arrangement wherein the air cylinder and piston assembly is completely free from the application of any forces from the hydraulic control portion of the arrangement other than along the longitudinal axis of the air cylinder and piston assembly.

It is a further object to provide a novel hydraulically controlled air cylinder and piston arrangement with the hydraulic control or checking portion of the arrangement disposed concentrically to the air cylinder and piston assembly and with a unique proportion of total length of the arrangement relative to the stroke of the air cylinder and piston assembly portion of the arrangement.

It is still another object to provide novel means in arrangements according to the preceding paragraphs for substantially eliminating the loss of any pressure area represented by the piston rod when air under pressure is applied to the air cylinder and piston assembly on the retraction operation of the air cylinder and piston assembly.

It is still another object to provide a novel air operated and hydraulically controlled cylinder and piston arrangement wherein the hydraulic control or checking forces are applied on the longitudinal centerline of the cylinder and piston assembly and wherein the arrangement is easily and simply convertible to hydraulic control or checking for either direction of operation of the air cylinder and piston assembly.

An important feature of the construction of the present invention is that the concentric hydraulic checking or control portion adds very little to the total length of the arrangement thereby providing for a maximum stroke of the air cylinder and piston assembly relative to the total length of the arrangement.

Other objects and features of the invention will be apparent upon a perusal of the following specification and drawings in which:

FIGURE 1 is a side elevational view of an air operated and hydraulically controlled or checked cylinder and piston arrangement constructed according to the invention;

FIGURE 2 is an end elevational view of the structure shown in FIGURE 1;

FIGURE 3 is an enlarged cross sectional view of the structure shown in FIGURE 1; and FIGURE 4 is a view similar to FIGURE 3 but showing the structure in a different adjusted position.

The present embodiment is the preferred embodiment, but it is to be understood that changes can be made in the present embodiment by one skilled in the art without departing from the spirit and scope of the present invention.

Generally, the invention comprises a forward cylinder head, a rearward cylinder head, and in intermediate cylinder head. A short cylinder is carried between the rear cylinder head and the intermediate cylinder head, and a relatively long air cylinder is carried between the forward cylinder head and the intermediate cylinder head. An air piston and rod are slidably carried in the long air cylinder with the rod extending outwardly of the forward cylinder head for connection in some tool arrangement. A second piston is slidably carried in the short cylinder and is connected to a short rod which extends outwardly of the rear cylinder head. In the present embodiment, the intermediate cylinder head carries, as an integral part thereof, an air control valve for selectively delivering air under pressure to either the rod or head end of the large air cylinder. It is contemplated that the air control valve may be carried remotely of the intermediate cylinder head. In the present embodiment as shown in the drawings, which is provided with hydraulic control or checking on the extension of the air piston, the ends of the large and small cylinders are interconnected in free air communication by an air conduit extending through the air valve.

The air piston rod is tubular in construction and internally carries a hydraulic control or check piston which is secured to a tubular piston rod. The tubular piston rod for the hydraulic control piston is secured to the intermediate cylinder head and carries the hydraulic control piston at a position adjacent the forward cylinder head. The rearward end of the tubular piston rod for the hydraulic control piston is connected by a check valve into the head end of the short cylinder. That tubular piston rod is further connected into the head end of the short piston by an adjustable metering valve.

As previously noted, the embodiment of the invention shown in the drawing provides hydraulic control or check on the extension of the air piston rod and therefore the rod end of the air piston rod is open to the atmosphere while the forward end of the tubular piston rod of the hydraulic control piston is sealed. From the drawing it may be seen that if hydraulic fluid is applied to the hydraulic fitting on the rear cylinder head, the hydraulic fluid will flow through the short piston rod into the head end of the short cylinder. From the head end of the short cylinder, the hydraulic fluid will flow through the check valve in the rearward end of the tubular piston rod for the hydraulic control piston, thence through the tubular piston rod for the hydraulic control piston, out of that tubular piston rod through a pair of holes positioned immediately rearwardly of the hydraulic control piston, and into the air piston rod between the hydraulic control piston and the head end of the air piston rod. If air under pressure from the air control valve is then delivered to the head end of the large air cylinder, the air piston will be moved toward the rod end of the air cylinder to extend the air piston rod outwardly of the large air cylinder. The air piston rod in moving forwardly will force the hydraulic fluid therein into the tubular piston rod for the hydraulic control piston and as the hydraulic fluid flowing into that tubular piston rod cannot flow through the check valve at the rearward end thereof, the hydraulic fluid must flow through the adjustable metering valve into the head end of the short cylinder. The hydraulic fluid thus displaced from the air piston rod will move the piston in the short cylinder away from the intermediate cylinder head and toward the rear cylinder head. Thus the extension of the air piston rod will be controlled or checked to a speed determined by the volume of hydraulic fluid that can flow through the adjustable metering valve at the developed pressures.

On the return or retraction stroke of the air piston, air under pressure is applied from the air control valve to the air conduit which interconnects the rod end of the large air cylinder and the rod end of the short cylinder, while the head end of the large air cylinder is connected to exhaust. The air under pressure in the rod end of the short cylinder will act against the piston therein to develop hydraulic fluid pressure in the hydraulic fluid in the head end of the short cylinder. That hydraulic fluid pressure will be applied through the check valve at the rearward end of the tubular piston rod for the hydraulic control piston, and through that tubular piston rod into the air piston rod to act against the head end of the air piston rod. Thus it may be seen that the air piston is retracted by air and fluid pressures acting over a total pressure area which is substantially equal to the area of the air piston. Thus the power areas for extension and retraction of the air piston are substantially the same. The actual difference between the two power areas is the area represented by the difference between the outer diameter and inner diameter of the air piston rod. In practice this difference is extremely small relative to the area of the air piston.

To convert the present embodiment of the invention to one wherein the hydraulic control or checking is applied to the retraction rather than the extension of the air piston, it is merely necessary to remove the plug at the forward end of the tubular piston rod for the hydraulic control piston, to open the rearward end of the air piston rod in free air communication with the head end of the large air cylinder, to seal the pair of holes through the piston rod for the hydraulic control piston which is located immediately rearwardly of the hydraulic control piston, and to seal the opening at the forward end of the air piston rod which in the drawing is connected in free air communication with the atmosphere. With those modifications, it may be seen that on the retraction of the air piston, hydraulic fluid in the forward or rod end of the air piston rod will be directed into the forward end of the tubular piston rod for the hydraulic control piston and through the adjustable metering valve into the head end of the short cylinder. In order to provide substantially equal power areas for both the extension and retraction of the air piston in the modified assembly, the connection of the rod end of the short cylinder to the rod end of the large air cylinder must be transferred to the head end of the large air cylinder.

From the foregoing general description of the invention it may importantly be seen that the hydraulic control or checking of the air piston is always applied to the air piston on the longitudinal center line thereof. By virtue of the detailed construction of the invention the axial hydraulic control or check is accomplished with very little increase in the total length of the arrangement and with the gaining of other advantages in operation and construction. The advantages in the relatively simple construction of the invention will be apparent from the hereinafter following detailed description.

In detail, the present invention comprises a forward cylinder head 10, an intermediate cylinder head 11 and a rear cylinder head 12. A large air cylinder 13 is carried between the forward cylinder head 10 and the intermediate cylinder head 11, and a short cylinder 14 is carried between the intermediate cylinder head 11 and the rear cylinder head 12. The large air cylinder 13 and the short cylinder 14 are positioned in axial alignment. The rearward side of the forward cylinder head is provided with a circular groove of a diameter substantially equal to the diameter of the large air cylinder 13 and an O-ring 15 is positioned in that circular groove. The forward end of the cylinder 13 is also positioned in that circular groove and against the O-ring 15. The forward side of the intermediate cylinder head 11 is provided with a circular groove of a diameter substantially equal to the diameter of the cylinder 13 and O-ring 16 is positioned in that groove. The rearward end of the cylinder 13 is also positioned in that circular groove and against the O-ring 16. The rearward side of the intermediate cylinder head 11 is provided with a circular groove of a diameter substantially equal to the diameter of the cylinder 14 and an O-ring 17 is positioned in that circular groove. The forward end of the cylinder 14 is also positioned in that circular groove and against the O-ring 17. The forward side of the rear cylinder head 12 is provided with a circular groove of a diameter substantially equal to the diameter of the cylinder 14 and an O-ring 18 is positioned in that circular groove. The rearward end of the cylinder 14 is also positioned in that circular groove and against the O-ring 18. The above described parts are secured together in a fluid sealing relationship by four tie rods 20. The four tie rods 20 extend from the rearward side of the rear cylinder head 12, through the rear cylinder head 12, the intermediate cylinder head 11, and into four holes in the forward cylinder head 10. The four holes in the forward cylinder head 10 are tapped and the forward ends of the tie rods 20 are threaded to be received in those tapped holes. The rearward ends of the tie rods 20 carry bolt heads for threading the tie rods 20 into the holes in the forward cylinder head 10 to draw the entire assembly of the three cylinder heads 10, 11 and 12 and the two cylinders 13 and 14 securely together as a unit. The tightening of the tie rods 20 causes the cylinder 13 and 14 to be securely seated in the various described circular grooves and against the O-rings 15, 16, 17 and 18 in a fluid sealing relationship. The tie rods 20 are further positioned in a substantially equally spaced apart realtionship to each other as may be seen in FIGURE 2.

The air piston for the large air cylinder 13 is indicated generally at 21, and the piston rod for the air piston 21 is indicated generally at 22. The air piston 21 comprises a pair of leather cups 23, a pair of discs 24, and a disc 25. The air piston rod 22 comprises a tubular member 26, a head cap 27 and a tool connector member 28. The head or rearward end of the tubular member 26 is provided with an annular shoulder against which one of the discs 24 is positioned. One of the leather cups 23 is positioned on the tubular member 26 against the first disc 24 with the disc 25, the other leather cup 23, and the other disc 24 stacked thereon. The head cap 27 is threaded on the head end of the tubular member 26 and against the stacked members of the piston 21 to secure the piston 21 to the tubular member 26. An O-ring 30 is positioned in the head cap 27 and against the head end of the tubular member 26 to seal the head end of the piston rod 22 against any fluid leakage.

The tool connector member 28 is threaded into the rod end of the tubular member 26 and is provided with a radial hole 31 for connection of the piston rod 22 to some tool arrangement. The forward end of the tubular member 26, immediately rearwardly of the tool connector member 28, is provided with a hole 32 which connects the forward end of the piston rod 22 in free air communication with the atmosphere.

The air piston 21 and piston rod 22 are slidably carried in the large air cylinder 13 for reciprocating movement therein with the forward end of the piston rod 22 extending through a hole in the forward cylinder head 10. As the forward cylinder head 10 may be formed of a relatively soft metal, a wear sleeve 33 is inserted in the hole through the forward cylinder head 10 and about the piston rod 22. To seal the periphery of the piston rod 22, a male bearing ring 34, a plurality of chevron sealing rings 35, and a female bearing ring 36 are positioned about the piston rod 22 and within the hole through the forward cylinder head 10. A locking ring 37 which is adapted to receive a spanner wrench is threaded into the forward end of the hole through the forward cylinder head 10 and against the bearing and sealing rings 34, 35 and 36 to seal the outer surface of the piston rod 22 against air leakage from the air cylinder 13.

The short cylinder 14 is provided with a cup shaped piston 40 which is carried in the cylinder 14 to define a hydraulic fluid chamber between the piston 40 and the rearward side of the intermediate cylinder head 11. The outer periphery of the piston 40 is provided with a pair of O-rings 41 which prevent fluid leakage from the chamber defined by the piston 40 into the rearward portion of the cylinder 14. A relatively short piston rod 42 is secured at one end thereof to the piston 40 through a centrally disposed hole in the piston 40. The rod 42 may be secured through that hole by an upsetting of the forward end of the rod 42. The rearward end of the rod 42 extends through an opening in the rear cylinder head 12 and an O-ring 43 provided in an annular groove in the opening through the rear cylinder head 12 effectively prevents air leakage from the cylinder 14 about the periphery of the rod 42. The rod 42 is further provided with an axial passageway 44 extending from the rearward end of the rod 42 into the chamber defined by the piston 40 and the rearward side of the intermediate cylinder head 11. The rearward end of the passageway 44 carries a hydraulic fluid fitting 45 by which hydraulic fluid may be supplied to the passageway 44. It may be seen from the drawing that the hydraulic fluid chamber defined by the piston 40 and the rearward side of the intermediate cylinder head 11 may be varied in volume depending upon the position of the piston 40 in the cylinder 14; the maximum volume of that chamber being shown by the dotted line position of the piston 40.

The invention further comprises a hydraulic control or check piston 47 and a stationary piston rod 48. The piston rod 48 is tubular and the rearward end thereof is formed of a reduced diameter for insertion through a shouldered hole 50 formed through the center of the intermediate cylinder head 11. The extreme rearward end of the stationary piston rod 48 extends rearwardly of the intermediate cylinder head 11 and is threaded to receive a cap and check valve assembly 51. The cap and check valve assembly 51 is formed with an opening extending axially therethrough. The forward portion of the opening is of a diameter substantially equal to the diameter of the rearwardly extending portion of the stationary piston rod 48 and is tapped to permit the assembly 51 to be threaded onto the rearwardly extending end of the stationary piston rod 48 to secure the piston rod 48 to the intermediate cylinder head 11. The central portion of the axial opening through the assembly 51 carries a check valve defined by a ball 52 and a spring 53. The ball 52 is normally maintained by the spring 53 in a rearward position blocking the rearward portion of the opening through the assembly 51. The spring 53 is compressed between the ball 52 and the rearward end of the stationary piston rod 48. The check valve portion of the assembly 51 will permit a substantially free flow of hydraulic fluid from the chamber defined by the piston 40 and the rearward side of the intermediate cylinder head 11 into the piston rod 48, but will prevent any fluid flow in the opposite direction.

From the intermediate cylinder head 11, the piston rod 48 extends through a central opening in the head cap 27 and axially through the tubular member 26 of the air piston rod 22 to a position substantially at the rearward side of the forward cylinder head 10. The opening through the head cap 27 of the air piston rod 22 is provided with an annular groove and an O-ring 54 is carried therein for effectively preventing any leakage of fluid through that opening and about the outer surface of the piston rod 48. The forward end of the piston rod 48 is both externally and internally threaded. The internal threads receive a cap 55 which seals the forward end of the piston rod 48. The underside of the cap 55 carries a small O-ring which cooperates with the forward end of the piston rod 48 to effectively prevent any fluid flow from the forward end of the piston rod 48. The external threads on the forward end of the piston rod 48 are provided for a nut 56 which secures the piston 47 on the piston rod 48. The rearward side of the piston 47 is retained by a snap ring 57 which is carried in an annular groove formed in the outer surface of the piston rod 48.

The hydraulic control or check piston 47 has an outer diameter substantially equal to the inner diameter of the tubular member 26 of the air piston rod 22 and an inner diameter substantially equal to the outer diameter of the tubular piston rod 48. The inner surface of the piston 47 is provided with an annular groove in which an O-ring 58 is carried to effectively prevent any fluid leakage between the piston 47 and the outer surface of the piston rod 48. The outer surface of the piston 47 is provided with a pair of axially spaced apart annular grooves in which a pair of O-rings 60 are carried to effectively prevent any fluid leakage between the inner surface of the tubular member 26 of the air piston rod 22 and the outer surface of the piston 47.

A number of openings for the passage of hydraulic fluid are provided through the tubular piston rod 48. One of these openings which is designated 61, is formed radially through the wall of the piston rod 48 at a longitudinal position substantially within the intermediate cylinder head 11 and in axial alignment with the lower end of an adjustable fluid metering valve 62 carried in the intermediate cylinder head 11. The other openings through the piston rod 48 are designated 63 and are formed radially through the wall of the piston rod 48 at a longitudinal position immediately rearwardly of the piston 47.

The adjustable fluid metering valve 62 comprises a screw member 64 which is threaded into an opening in the intermediate cylinder head 11. That opening is in axial alignment with the opening 61 in the piston rod 48 and perpendicular to the axis of the cylinders 13 and 14. An O-ring 67 carried in an annular groove formed in the screw member 64 prevents the leakage of hydraulic fluid from the opening carrying the screw member 64. The threaded portion of the screw member 64 is provided with a tapered notch 65. The tapered notch 65 is larger in cross sectional area at the lower end thereof which cooperates with the opening 61 than at the upper end thereof where the notch 65 tapers substantially to a point. When the screw member 64 is substantially completely threaded into the intermediate cylinder head 11, the upper or smallest end of the notch 65 is in fluid communication with a passageway 66 which extends into the chamber defined by the piston 40 and the rearward side of the intermediate cylinder head 11. Thus it may be seen that when the screw member 64 is completely threaded into the intermediate cylinder head 11, a minimum volume of hydraulic fluid may flow between the opening 61 and the passageway 66, and as the screw member 64 is threaded outwardly of the intermediate cylinder head 11 an increasingly larger area of the notch 65 moving past the passageway 66 which provide for progressively larger fluid flow between the opening 61 and the passageway 66. The setting of the screw member 64 of the valve 62 will determine the amount of hydraulic fluid control or checking which will be applied on the extension of the air piston and rod 21 and 22.

It is intended that the invention carry a certain amount of hydraulic fluid, which fluid is supplied to the invention through the hydraulic fitting 45. When the piston 40 engages the rearward side of the intermediate cylinder head 11, and when the air piston and rod 21 and 22 are completely retracted, as shown in FIGURE 3, the following portions of the invention are completely filled with hydraulic fluid: Passageway 44 in the short piston rod 42, the chamber defined by the piston 40 and the rearward side of the intermediate cylinder head 11, the cap and check valve assembly 51, passageway 66 and the tapered notch 65, the interior of the piston rod 48, and the interior of the air tubular member 26 of the air piston rod 22 between the piston 47 and the head cap member 27.

From the foregoing description of the invention it may be seen that if the air piston and rod 21 and 22 are extended, the hydraulic fluid in the tubular member 26 of the air piston rod 22 will be forced through the openings 63 in the stationary piston rod 48, through the piston rod 48, the opening 61, tapered notch 65, passageway 66 and into the chamber defined by the piston 40 and the rearward side of the intermediate cylinder head 11 to cause the piston 40 to be moved toward the rear cylinder head 12. On a retraction of the air piston and rod 21 and 22, hydraulic fluid from the chamber defined between the piston 40, the cylinder 14 and the rearward side of the intermediate cylinder head 11 will flow through the check valve assembly 51, through the piston rod 48, openings 63, and into the tubular member 26 of the air piston rod 22.

The remainder of the invention comprises an air passageway 70 and an air passageway 71 formed in the intermediate cylinder head 11, a tubular member 72, an air passageway 73 formed in the forward cylinder head 10, an air passageway 74 formed in the rear cylinder head 12, and an air control valve 75.

The air valve 75 is carried on the intermediate cylinder head 11 and is connected to the air pasasgeways 70 and 71. It is not necessary that the air valve 75 form an integral part of the intermediate cylinder head 11, but may be carried remotely thereof, it merely being necessary that the air valve 75 be selectively operable to deliver air under pressure to one of the air passageways 70 and 71 while exhausting air from the other of those passageways.

The tubular member 72 which comprises an air conduit is carried through the intermediate cylinder head 11 independently of the air passageway 70. The interior of the tubular member 72 is in free air communication with the air passageway 71 by an opening 76 formed through the wall of the tubular member 72 intermediate the ends thereof. A pair of annular grooves are formed in the outer surface of the tubular member 72 on each side of the opening 76 and an O-ring 77 is carried in each of those annular grooves to effectively prevent any leakage of air from air passageway 71 about the outer surface of the tubular member 72.

The end of the air passageway 70 opposite from that connected to the air valve 75 is connected into the head end of the air cylinder 13.

The forward end of the tubular member 72 is connected through the forward cylinder head 10 into the air passageway 73. The air passageway 73 is in turn connected into the rod end of the air cylinder 13. Air leakage from the passageway 73 is effectively prevented by an O-ring 78 which is carried in an annular groove formed in the outer surface of the portion of the tubular member 72 which is carried in the forward cylinder head 10. The rearward end of the tubular member 72 is connected through the rear cylinder head 12 into the air passageway 74. The air passageway 74 is in turn connected into the rod end of the short cylinder 14. Air leakage from the air passageway 74 is effectively prevented by an O-ring 80 which is carried in an annular groove formed in a portion of the outer surface of the tubular member 72 which extends into the rear cylinder head 12.

From the foregoing it may be seen that when the air valve 75 is operated to deliver air under pressure to air passageway 70 while exhausting air passageway 71, the air piston and rod 21 and 22 will be extended at a speed determined by the volume of hydraulic fluid flow through the metering valve 62 at the developed pressure. It should be noted that the hydraulic control or checking forces on the air piston and rod 21 and 22 are applied uniformly about the axis of the air piston and cylinder 21 and 22. It should further be noted that as the air piston and rod 21 and 22 is extended the hydraulic fluid chamber or reservoir defined between the piston 40 and the rearward side of the intermediate cylinder head 11 is expanded against substantially no back pressure since the rod end of the cylinder 14 is connected to exhaust.

Assuming that the air cylinder and piston 21 and 22 are completely extended and that the piston 40 is positioned approximately at the dotted line position of FIGURE 3, the selective operation of the air valve 75 to deliver air under pressure to air passageway 71 while exhausting air from air passageway 70 will cause the air piston and rod 21 and 22 to be retracted both by the application of air under pressure to the rod end of the air cylinder 13 from air passageway 73, and by the application of hydraulic fluid under pressure to the head cap 27 of the air piston 22. The hydraulic fluid pressure on the head cap 27 of the air piston 22 will be developed by the air pressure applied to the piston 40 from the tubular member 72 and air passageway 74. The air pressure on the piston 40 will produce hydraulic fluid pressure on the head cap 27 through the check valve 51, the tubular piston rod 48, openings 63, and the interior of tubular member 26 of the air piston rod 22.

FIGURE 4 shows the conversion of the above described embodiment for hydraulic control or checking on the retraction rather than the extension of the air piston. Parts in FIGURE 4 which are identical to parts shown in FIGURE 3 are identically numbered. Considering FIGURE 4 in comparison to FIGURE 3 it may be seen that the cap 55 which seals the forward end of the piston rod 48 has been removed. Further, the head cap 27 has been removed to open the rearward end of the air piston rod 22 in free air communication with the head end of the large air cylinder 13. A member 27a retains the parts of the piston head 21 together on the air piston rod 22. Further, the pair of holes 63 through the piston rod 48 for the hydraulic control piston 47 are sealed by the sealing members 63a. A further adjustment is the seal 32a which seals the opening 32 at the forward end of the air piston rod 22. In the adjusted embodiment for hydraulic control or checking on the retraction rather than the extension of the air piston, the forward end of the air piston rod 22 is filled with the hydraulic fluid rather than the rearward end thereof as in FIGURE 3. FIGURE 4 shows that on retraction of the air piston 21, hydraulic fluid in the forward or rod end of the air piston rod 22 will be directed into the forward end of the tubular piston rod 48 for the hydraulic control piston 47 and through the adjustable metering valve 62 into the head end of the short cylinder 14. In order to provide substantially equal power areas for both the extension and retraction of the air piston 21 in the modified assembly of FIGURE 4, the connection of the rod end of the short cylinder 14 to the rod end of the large air cylinder 13 transferred to the head end of the large air cylinder 13. This is shown by way of example in FIGURE 4 by a breaking of the tubular member 72 at the rearward side of cylinder head 11 to provide a tubular member 72a extending between air passageway 73 formed in the forward cylinder head 10 and an opening 76 through the wall thereof which opens into air passageway 71 and with a sealed end 72b. The remaining portion 72c of the tubular member 72 is connected from the passageway 74 of rear cylinder head 12 through the cylinder head 11 and into air passageway 70 thereof.

Having described the invention what is considered new and desired to be protected by Letters Patent is:

1. In an air operated hydraulically controlled air piston and cylinder arrangement, an elongated air cylinder, an air piston and rod slidably carried in said cylinder for reciprocating movement therein, said air piston rod being tubular, hydraulic control means carried through the head end of said cylinder and extending through said air piston and into said air piston rod for applying hydraulic control forces on said air piston rod to check the speed of movement of said air piston rod in one direction and to augment the directly applied air pressure on said air piston and rod in the other direction, and said hydraulic control means comprising a second cylinder carried on the head end of the first cylinder, a hydraulic piston slidably carried in said second cylinder, hydraulic circuit means connecting said second cylinder into said air piston rod, and air circuit means for applying air pressure to said hydraulic piston in said second cylinder to augment said directly applied air pressure on said air piston and rod in said other direction.

2. In an air operated hydraulically controlled air piston and cylinder arrangement, an elongated air cylinder, an air piston and rod slidably carried in said cylinder for reciprocating movement therein, said air piston rod being tubular, a tubular rod of a diameter substantially less than the diameter of said air piston rod, one end of said tubular rod extending through the head end of said cylinder with the remaining portion of said tubular rod extending through an opening in the head end of said air piston rod and through said air piston rod with the other end of said tubular rod positioned substantially longitudinally adjacent to the rod end of said cylinder, a hydraulic control piston secured on said other end of said tubular rod said other end of said tubular rod being closed and an opening formed through said tubular rod adjacent said hydraulic control piston between said hydraulic control piston and said one end of said tubular rod, a second cylinder secured to the head end of the first cylinder in longitudinal alignment therewith and including said one end of said tubular rod, a hydraulic fluid check valve carried on said one end of said tubular rod in said second cylinder, said check valve formed to prevent the flow of any hydraulic fluid in a direction from said tubular rod into said second cylinder, a second piston slidably carried in said second cylinder to define a hydraulic fluid reservoir between said second piston and the head end of said first cylinder, hydraulic fluid substantially filling the interior of said second cylinder between said second piston and the head end of said first cylinder, said tubular rod and the interior of said air piston rod between the head end of said air piston rod and said hydraulic control piston, an adjustable hydraulic fluid metering valve formed in the head end of said first cylinder and connected between the portion of said tubular rod passing through said head end of said first cylinder and said defined hydraulic fluid reservoir for adjustably restricting the flow of hydraulic fluid from said tubular rod into said defined reservoir, and an air conduit connected between the rod end of said first cylinder and the end of said second cylinder opposite from said defined reservoir.

3. In an air operated hydraulically controlled air piston and cylinder arrangement, an elongated air cylinder, an air piston and rod slidably carried in said cylinder for reciprocating movement therein, said air piston rod being tubular and having an opening therethrough at the rod end thereof for maintaining said rod end thereof at atmospheric air pressure, a tubular rod of a diameter substantially less than the diameter of said air piston rod, means securing one end of said tubular rod through the head end of said cylinder with said tubular rod extending through said air piston and into said air piston rod, a hydraulic control piston secured to the end of said tubular rod extending into said air piston rod, an opening formed through said tubular rod adjacent said hydraulic control piston between said hydraulic control piston and said one end of said tubular rod, hydraulic fluid substantially filling the interior of said tubular rod and the interior of said air piston rod between the head end of said air piston rod and said hydraulic control piston, and hydraulic fluid control means for restricting the flow of said hydraulic fluid from said one end of said tubular rod to apply a hydraulic checking force on the head end of said air piston rod contemporaneously with the extension of said air piston and rod, said hydraulic fluid control means including means for increasing the pressure of said hydraulic fluid in said tubular rod and said air piston rod to apply a hydraulic retracting force on the head end of said air piston rod contemporaneously with the retraction of said air piston and rod.

4. In an air operated hydraulically controlled air piston and cylinder arrangement as defined in claim 3, wherein said hydraulic fluid control means including means comprises a hydraulic fluid reservoir carried on the head end of said cylinder, an adjustable hydraulic fluid metering valve connected between said one end of said tubular rod and said reservoir, and a hydraulic fluid check valve connected between said reservoir and said one end of said tubular rod, said metering valve operating to restrict the flow of hydraulic fluid from said tubular rod to said reservoir on the extension of said air piston and rod, said check valve permitting free hydraulic fluid flow in a direction from said reservoir into said tubular rod, and means for developing a hydraulic fluid pressure in said reservoir contemporaneously with the retraction of said air piston and rod.

5. In an air operated hydraulically controlled air piston and cylinder arrangement as defined in claim 4, wherein said last mentioned means for developing a hydraulic fluid pressure in said reservoir contemporaneously with the retraction of said air piston and rod comprises air responsive piston means in said reservoir for developing hydraulic fluid pressure in said reservoir, and an air conduit connected between the rod end of said cylinder and said piston means in said reservoir.

6. In an air operated hydraulically controlled air piston and cylinder arrangement, an elongated air cylinder, an air piston and rod slidably carried in said cylinder for reciprocating movement therein, said air piston rod being tubular and opening into the head end of said cylinder, a tubular rod of a diameter substantially less than the diameter of said air piston rod, means securing one end of said tubular rod through the head end of said cylinder with said tubular rod extending through said air piston and into the open end of said air piston rod, a hydraulic control piston secured to the end of said tubular rod extending into said air piston rod, the end of said tubular rod extending into said air piston and through said hydraulic control piston being open, hydraulic fluid substantially filling the interior of said tubular rod and the interior of said air piston rod between the rod end of said air piston rod and said hydraulic control piston, and hydraulic fluid control means for restricting the flow of said hydraulic fluid from said one end of said tubular rod to apply a hydraulic checking force on the rod end of said air piston rod contemporaneously with the retraction of said air piston and rod, said hydraulic fluid control means including means for increasing the pressure of said hydraulic fluid in said tubular rod and said air piston rod to apply a hydraulic extending force on the rod end of said air piston rod contemporaneously with the extension of said air piston and rod.

7. In an air operated hydraulically controlled air piston and cylinder arrangement as defined in claim 6, wherein said hydraulic fluid control means including means comprises a hydraulic fluid reservoir carried on the head end of said cylinder, an adjustable hydraulic fluid metering valve connected between said one end of said tubular rod and said reservoir, and a hydraulic fluid check valve connected between said reservoir and said one end of said tubular rod, said metering valve operating to restrict the flow of hydraulic fluid from said tubular rod to said reservoir on the retraction of said air piston and rod, said check valve permitting free hydraulic fluid flow in a direction from said reservoir into said tubular rod, and means for developing a hydraulic fluid pressure in said reservoir contemporaneously with the extension of said air piston and rod.

8. In an air operated hydraulically controlled air piston and cylinder arrangement as defined in claim 7, wherein said last mentioned means for developing a hydraulic fluid pressure in said reservoir contemporaneously with the extension of said air piston and rod comprises, air responsive piston means in said reservoir for developing hydraulic fluid pressure in the fluid in said reservoir, and an air conduit connected between the head end of said cylinder and said piston means in said reservoir.

References Cited by the Examiner
UNITED STATES PATENTS

| | | |
|---|---|---|
| 706,688 | 8/02 | Reynders & Sears. |
| 2,193,736 | 3/40 | Onions. |
| 2,664,859 | 1/54 | Green. |
| 2,674,138 | 4/54 | Mize. |
| 2,679,827 | 6/54 | Perdue. |
| 2,860,604 | 11/58 | Morf. |
| 3,146,680 | 9/64 | Hutter et al. _____ 92—12 |

FOREIGN PATENTS

| | | |
|---|---|---|
| 165,478 | 10/55 | Australia. |
| 821,319 | 10/59 | Great Britain |

FRED E. ENGELTHALER, *Primary Examiner.*

RICHARD B. WILKINSON, *Examiner.*